United States Patent
Kim et al.

(10) Patent No.: US 9,151,952 B2
(45) Date of Patent: Oct. 6, 2015

(54) METHOD OF DRIVING A DISPLAY PANEL, A DISPLAY PANEL DRIVING APPARATUS FOR PERFORMING THE METHOD AND A DISPLAY APPARATUS HAVING THE DISPLAY PANEL DRIVING APPARATUS

(71) Applicant: SAMSUNG DISPLAY CO., LTD., Gyeonggi-Do (KR)

(72) Inventors: Ji-Woong Kim, Gyeonggi-Do (KR); Nam-Hee Goo, Chungcheongnam-do (KR); Yu-Han Bae, Seoul (KR); Bo-Ram Kim, Seoul (KR); Su-Bin Park, Incheon (KR); Ho-Jin Byun, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 136 days.

(21) Appl. No.: 13/627,585

(22) Filed: Sep. 26, 2012

(65) Prior Publication Data

US 2013/0335384 A1    Dec. 19, 2013

(30) Foreign Application Priority Data

Jun. 13, 2012    (KR) .................. 10-2012-0063067

(51) Int. Cl.
G09G 5/00 (2006.01)
A47F 5/00 (2006.01)
G02B 27/00 (2006.01)
G02B 27/22 (2006.01)
H04N 13/04 (2006.01)

(52) U.S. Cl.
CPC ........ *G02B 27/0093* (2013.01); *G02B 27/2214* (2013.01); *H04N 13/0413* (2013.01); *H04N 13/0468* (2013.01); *H04N 13/0477* (2013.01); *H04N 13/0497* (2013.01)

(58) Field of Classification Search
USPC ............................ 345/204, 87, 690, 156–173
See application file for complete search history.

(56) References Cited

U.S. PATENT DOCUMENTS

| | | | | |
|---|---|---|---|---|
| 6,311,141 B1 * | 10/2001 | Hazra | ............................ | 702/150 |
| 6,348,928 B1 * | 2/2002 | Jeong | ............................ | 345/649 |
| 6,553,281 B1 * | 4/2003 | Liu | ................................ | 700/302 |
| 2004/0178969 A1 | 9/2004 | Zhang et al. | | |
| 2006/0071135 A1 * | 4/2006 | Trovato | ..................... | 248/289.11 |
| 2011/0006979 A1 * | 1/2011 | Min et al. | ....................... | 345/156 |

(Continued)

FOREIGN PATENT DOCUMENTS

| | | |
|---|---|---|
| JP | 2001-095014 | 4/2001 |
| KR | 1020070023849 | 3/2007 |

(Continued)

*Primary Examiner* — Grant Sitta
(74) *Attorney, Agent, or Firm* — F. Chau & Associates, LLC

(57) ABSTRACT

A display panel driving apparatus includes a user position data output part and a move control part. The user position data output part receives user image data and outputs user position data based on the user image data. The user image data is generated by photographing a user. The user position data is generated by mapping a position of the user to a display panel. The move control part compares a plurality of set area data with the user position data and outputs a move control signal based on the comparison of the user position data and the set area data. The set area data is set to the display panel. The move control signal controls a movement of the display panel.

21 Claims, 10 Drawing Sheets

(56) References Cited

U.S. PATENT DOCUMENTS

2011/0157161 A1* 6/2011 Choi et al. ................ 345/419
2012/0081504 A1* 4/2012 Ng et al. ................ 348/14.08

FOREIGN PATENT DOCUMENTS

| KR | 1020090102314 | * | 5/2011 |
| KR | 1020110045654 | | 5/2011 |

* cited by examiner

METHOD OF DRIVING A DISPLAY PANEL, A DISPLAY PANEL DRIVING APPARATUS FOR PERFORMING THE METHOD AND A DISPLAY APPARATUS HAVING THE DISPLAY PANEL DRIVING APPARATUS

CROSS-REFERENCE TO RELATED APPLICATION

This application claims priority under 35 U.S.C. §119 to Korean Patent Application No. 10-2012-0063067, filed on Jun. 13, 2012 in the Korean Intellectual Property Office (KIPO), the disclosure of which is incorporated by reference herein in its entirety.

BACKGROUND

1. Technical Field

The present invention relates to a method of driving a display panel, a display panel driving apparatus for performing the method and a display apparatus having the display panel driving apparatus.

2. Discussion of the Related Art

Recently, three-dimensional (3D) stereoscopic image display technology has seen increased application in a variety of fields such as video games, movies, etc. A display apparatus such a liquid crystal display is typically used to display 3D stereoscopic images.

Generally, a 3D stereoscopic image display apparatus displays the 3D stereoscopic image using binocular parallax occurring between the eyes of a human such as a user. For example, binocular parallax may exist due to the eyes of the user being spaced apart from each other, and thus, a two dimensional (2D) image viewed by the left eye is different from that viewed by the right eye. The brain of the user mixes the two different 2D images so that the user may recognize the 3D stereoscopic image.

The 3D stereoscopic image display apparatus may be classified as a stereoscopic type and an auto-stereoscopic type depending on whether the user wears 3D glasses or not. The stereoscopic type may include an anaglyph type, a shutter glass type and the like. In the anaglyph type, blue glasses and red glasses may be required for the user to wear. In the shutter glass type, a left eye image and a right eye image may be temporally divided to be periodically displayed, and the user wears glasses which open and close a left eye shutter and a right eye shutter in synchronization with the period of the left eye image and the right eye image.

The auto-stereoscopic type may include a lenticular type and a barrier type. In the lenticular type, a lenticular lens having a plurality of focal points is used. A 2D plane image is refracted by the lenticular lens at the focal points so that the 3D stereoscopic image is displayed. In the barrier type, a plurality of barriers selectively covering a display panel is used. The barriers enable a left eye image to be viewed by a left eye of the user and a right eye image to be viewed by a right eye of the user, and thus, the 2D plane image is converted to the 3D stereoscopic image.

However, in the auto-stereoscopic type, the left eye image may be viewed by the right eye of the user and the right eye image may be viewed by the left eye of the user, and thus, the left eye image and the right eye image overlap each other. This may cause crosstalk in the 3D stereoscopic image, and thus, degrade a display quality of the display apparatus.

SUMMARY

Exemplary embodiments of the present invention provide a method of driving a display panel capable of enhancing a display quality of a display apparatus.

Exemplary embodiments of the present invention provide a display panel driving apparatus for performing the above-mentioned method of driving the display panel.

Exemplary embodiments of the present invention provide a display apparatus having the above-mentioned display panel driving apparatus.

According to an exemplary embodiment of the present invention, there is a provided a method of driving a display panel. In the method, user image data is received and user position data based on the user image data is output. A plurality of set area data is compared with the user position data and a move control signal based on the comparison of the user position data and the set area data is output. The movement of the display panel is controlled in response to the move control signal. The user image data is generated by photographing a user. The user position data is generated by mapping a position of the user to the display panel. The set area data is set to the display panel.

In an exemplary embodiment of the present invention, the move control signal may be outputted by outputting a fix signal to fix the display panel in place when the user position data and the set area data are substantially the same and outputting a move signal to move the display panel when the user position data and the set area data are different from each other.

In an exemplary embodiment of the present invention, the movement of the display panel may be controlled by matching the user position data with the set area data.

In an exemplary embodiment of the present invention, the user position data may be matched with the set area data by matching the user position data with the set area data adjacent to the user position data.

In an exemplary embodiment of the present invention, the position of the user may be a position of an eye of the user.

In an exemplary embodiment of the present invention, a left eye and a right eye of the user may be disposed in a first direction substantially parallel with a long side of the display panel, the set area data may be set along the first direction in a row, and the movement of the display panel may be controlled by moving the display panel in the first direction.

In an exemplary embodiment of the present invention, a left eye and a right eye of the user may be disposed in a second direction substantially parallel with a short side of the display panel, the set area data may be set along the second direction in a row, and the movement of the display panel may be controlled by moving the display panel in the second direction.

In an exemplary embodiment of the present invention, the movement of the display panel may be controlled by spinning the display panel.

In an exemplary embodiment of the present invention, the movement of the display panel may be controlled by moving the display panel in a straight line.

In an exemplary embodiment of the present invention, a difference between the user position data and the set area data may be calculated to generate the move control signal.

In an exemplary embodiment of the present invention, two-dimensional (2D) plane image data may be converted to three-dimensional (3D) stereoscopic image data by selectively transmitting and blocking the 2D plane image data applied to the display panel.

According to an exemplary embodiment of the present invention, a display panel driving apparatus includes a user position data output part and a move control part. The user position data output part receives user image data and outputs user position data based on the user image data. The user image data is generated by photographing a user. The user position data is generated by mapping a position of the user to a display panel. The move control part compares a plurality of set area data with the user position data and outputs a move control signal based on the comparison of the user position data and the set area data. The set area data is set to the display panel. The move control signal controls a movement of the display panel.

In an exemplary embodiment of the present invention, the move control part may output a fix signal fixing the display panel in place when the user position data and the set area data are substantially the same, and the move control part may output a move signal moving the display panel when the user position data and the set area data are different from each other.

According to an exemplary embodiment of the present invention, a display apparatus includes a display panel and a display panel driving apparatus. The display panel displays image data and includes a plurality of set area data. The set area data is set to the display panel. The display panel driving apparatus includes a user position data output part receiving user image data and outputting user position data based on the user image data, and a move control part comparing the set area data with the user position data and outputting a move control signal based on the comparison of the user position data and the set area data. The user image data is generated by photographing a user. The user position data is generated by mapping a position of the user to the display panel. The move control signal controls a movement of the display panel.

In an exemplary embodiment of the present invention, the move control part may output a fix signal fixing the display panel in place when the user position data and the set area data are substantially the same, and the move control part may output a move signal moving the display panel when the user position data and the set area data are different from each other.

In an exemplary embodiment of the present invention, the image data may be 2D plane image data, and the display apparatus may further include a barrier part disposed on the display panel, the barrier part including a transmittance cell and a block cell, the barrier part converting the 2D plane image data to 3D stereoscopic image data.

In an exemplary embodiment of the present invention, a left eye and a right eye of the user may be disposed in a first direction substantially parallel with a long side of the display panel, the set area data may be set along the first direction in a row, and the move control part may move the display panel in the first direction.

In an exemplary embodiment of the present invention, the transmittance cell and the block cell may be alternately disposed in the first direction and extend in a second direction substantially perpendicular to the first direction.

In an exemplary embodiment of the present invention, a left eye and a right eye of the user may be disposed in a second direction substantially parallel with a short side of the display panel, the set area data may be set along the second direction in a row, and the move control part may move the display panel in the second direction.

In an exemplary embodiment of the present invention, the transmittance cell and the block cell may be alternately disposed in the second direction and extend in a first direction substantially perpendicular to the second direction.

According to an exemplary embodiment of the present invention, there is a provided a method of driving a display panel. In the method, user detection data is received, user position data based on the user detection data is generated, the user position data indicative of a position of the user with respect to a display panel, and the display panel is moved based on a comparison of the user position data with data indicative of predetermined viewing locations.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENTS

Hereinafter, exemplary embodiments of the present invention will be explained in detail with reference to the accompanying drawings.

Figure 1:
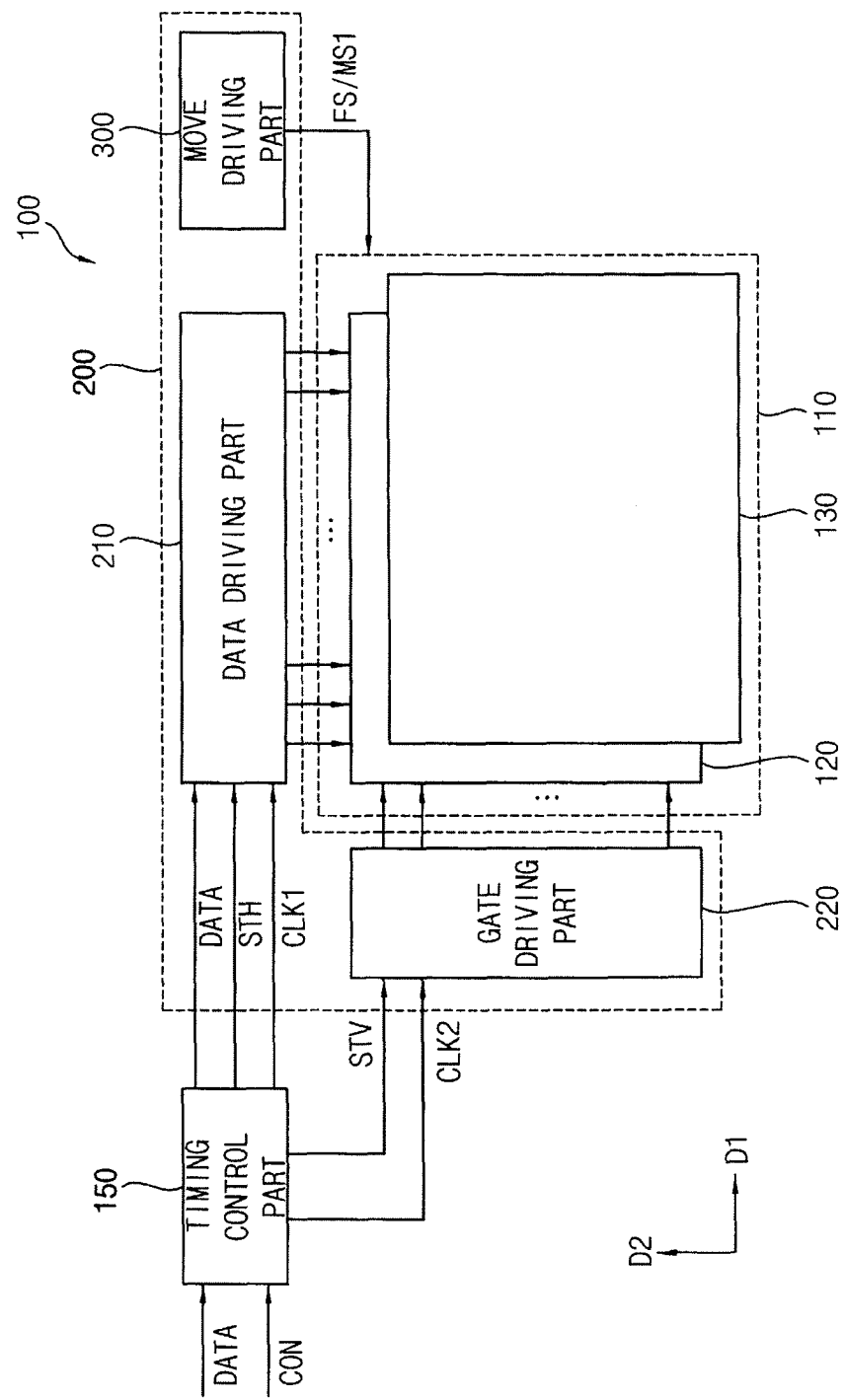
FIG. 1 is a block diagram illustrating a display apparatus according to an exemplary embodiment of the present invention.

FIG. 1 is a block diagram illustrating a display apparatus according to an exemplary embodiment of the present invention.

Referring to FIG. 1, the display apparatus 100 according to the present exemplary embodiment includes a display panel assembly 110, a timing control part 150 and a driving part 200.

The display panel assembly 110 displays a three-dimensional (3D) stereoscopic image, and includes a display panel 120 and a barrier part 130.

The display panel 120 receives image data DATA to display an image. For example, the image data DATA may be two-dimensional (2D) plane image data. Alternatively, the image data DATA may include left eye image data and right eye image data for displaying the 3D stereoscopic image. When the image data DATA includes the left eye image data and the right eye image data, the left eye image data and the right eye image data may be alternately disposed in the display panel 120.

The display panel 120 includes a gate line substantially parallel with a first direction D1, a data line substantially parallel with a second direction D2 substantially perpendicular to the first direction D1, and a plurality of pixels. The first direction D1 may be substantially parallel with a long side of the display panel 120, and the second direction D2 may be substantially parallel with a short side of the display panel 120.

For example, the display panel 120 may include M×N (M and N are natural numbers) pixels. Each of the pixels includes a thin-film transistor electrically connected to the gate line and the data line, a liquid crystal capacitor and a storage capacitor connected to the thin-film transistor.

The barrier part 130 is disposed on the display panel 120. Alternatively, the barrier part 130 may be disposed under the display panel 120. The barrier part 130 includes a plurality of liquid crystal cells, and the liquid crystal cells alternately include a transmittance cell and a block cell. The left eye image data is viewed at a left eye of a user and the right eye image data is viewed at a right eye of a user by way of the transmittance cell and block cell in the barrier part 130.

In the present exemplary embodiment, the display panel assembly 110 includes the barrier part 130 on the display panel 120 for displaying the 3D stereoscopic image, but it is not limited thereto. For example, the display panel assembly 110 may include a lenticular lens part having a lenticular lens on the display panel 120.

The left eye image data and the right eye image data of the image data DATA displayed by the display panel assembly 110 including the barrier part 130 may overlap with each other according to a position of the user such that the wrong image data is viewed by the user. Thus, crosstalk in the 3D stereoscopic image may occur.

For example, the left eye image data is viewed at the left eye of the user and the right eye image data is viewed at the right eye of the user by way of the barrier part 130 in a plurality of set areas set according to the position of the user. However, the left eye image data and the right eye image data may overlap with each other when the user is not in the set areas. Thus causing right eye image data to be viewed by the user's left eye and left eye image data to be viewed by the user's right eye.

The timing control part 150 receives the image data DATA and a control signal CON from the outside. The control signal CON may include a horizontal synchronous signal Hsync, a vertical synchronous signal Vsync and a clock signal.

The timing control part 150 generates a data start signal STH using the horizontal synchronous signal Hsync and outputs the data start signal STH to a data driving part 210. In addition, the timing control part 150 generates a gate start signal STV using the vertical synchronous signal Vsync and outputs the gate start signal STV to a gate driving part 220. In addition, the timing control part 150 generates a first clock signal CLK1 and a second clock signal CLK2 using the clock signal and outputs the first clock signal CLK1 to the data driving part 210 and the second clock signal CLK2 to the gate driving part 220.

The driving part 200 includes the data driving part 210, the gate driving part 220 and a move driving part 300.

The data driving part 210 outputs the image data DATA to the data line in response to the first clock signal CLK1 and the data start signal STH provided from the timing control part 150.

The gate driving part 220 generates a gate signal using the gate start signal STV and the second clock signal CLK2 provided from the timing control part 150 and outputs the gate signal to the gate line.

The move driving part 300 compares user position data generated by mapping the position of the user to the display panel 120 and the set area data set to the display panel 120 in a row, to generate and output a move control signal FS/MS1 for controlling a movement of the display panel assembly 110 including the display panel 120 and the barrier part 130. The move control signal FS/MS1 includes a fix signal FS for fixing the display panel assembly 110 and a move signal MS1 for moving the display panel assembly 110 in the first direction D1.

Specifically, the move driving part 300 determines that the user position data and the set area data are substantially the same or not, to output the fix signal FS for fixing the display panel assembly 110 when the user position data and the set area data are substantially the same and to output the move signal MS1 for moving the display panel assembly 110 when the user position data and the set area data are different from each other.

For example, the display panel assembly 110 may spin in the first direction D1 in response to the move signal MS1. Alternatively, the display panel assembly 110 may move in a straight line in the first direction D1 in response to the move signal MS1. The display apparatus 100 may further include a motor part for spinning or moving the display panel assembly 110.

Figure 2:
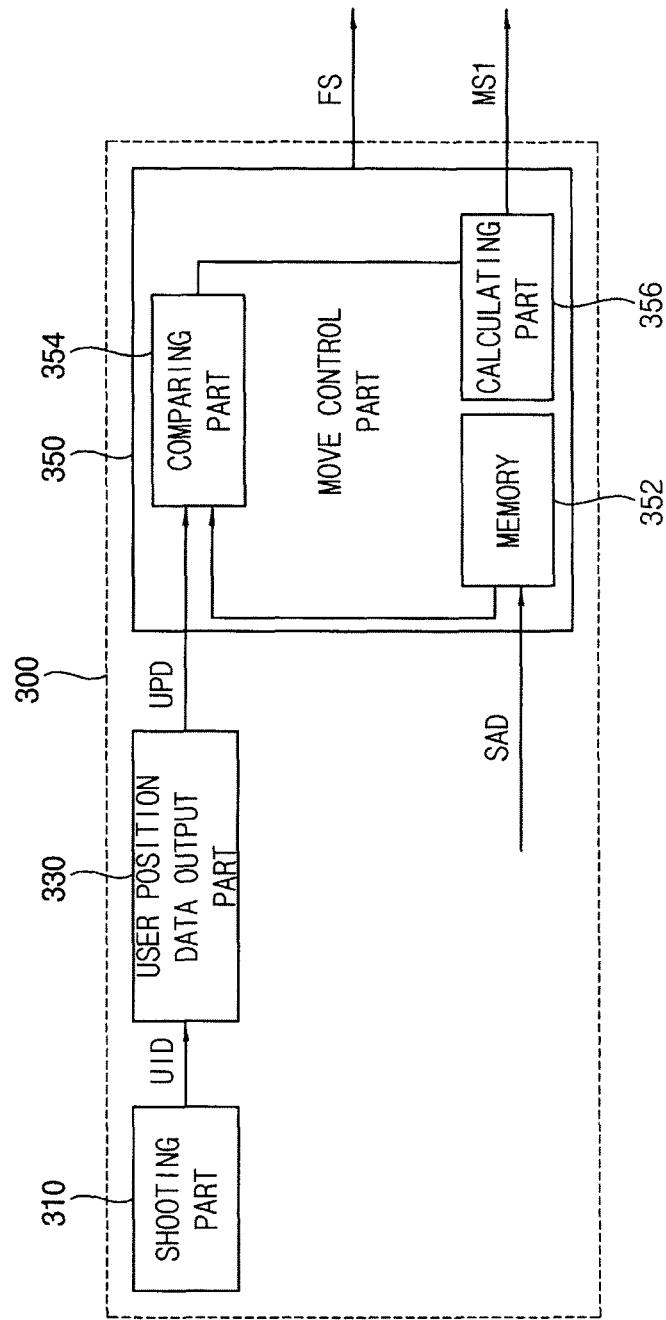
FIG. 2 is a block diagram illustrating a move driving part of FIG. 1, according to an exemplary embodiment of the present invention.

FIG. 2 is a block diagram illustrating the move driving part 300 of FIG. 1, according to an exemplary embodiment of the present invention.

Referring to FIGS. 1 and 2, the move driving part 300 includes a shooting part 310, a user position data output part 330 and a move control part 350.

The shooting part 310 shoots the user to generate and output user image data UID. Specifically, the shooting part 310 shoots an eye of the user having the left eye and the right eye disposed in the first direction D1. For example, the shooting part 310 may include a camera for shooting (e.g., photographing) the user, and the camera may be disposed at a central portion of an upper end of the display panel assembly 110. The shooting part 310 may further include another device, such as a sensor, capable of detecting the presence and location of the user.

The user position data output part 330 analyzes the position of the user based on the user image data UID to output a user position data UPD generated by mapping the position of the user to the display panel 120.

Specifically, the user position data output part 330 analyzes a position of the eye of the user. For example, the user position data output part 330 may determine the position of the eye of the user using an angle formed by the eye of the user and both sides of the display panel 120.

The move control part 350 compares the user position data UPD and the set area data SAD to generate and output the fix signal FS or the move signal MS1. The move control part 350 includes a memory 352, a comparing part 354 and a calculating part 356.

The memory 352 stores the set area data SAD set to the display panel 120 in the row. The set area data SAD identify areas where the left eye image data is to be viewed by the left eye of the user through the barrier part 130 and the right eye image data is to be viewed by the right eye of the user through the barrier part 130. Thus, the set area data SAD identify areas where crosstalk in the 3D stereoscopic image does not occur.

The comparing part 354 compares the user position data UPD and the set area data SAD. The comparing part 354 outputs the fix signal FS when the user position data UPD and the set area data SAD are substantially the same.

The set area data SAD compared with the user position data UPD by the comparing part 354 may be the set area data SAD adjacent to the user position data UPD.

The calculating part 356 calculates a difference between the user position data UPD and the set area data SAD when the user position data UPD and the set area data SAD are different from each other, and outputs the move signal MS1 for moving the display panel assembly 110 in the first direction D1 based on the difference between the user position data UPD and the set area data SAD.

Figure 3:
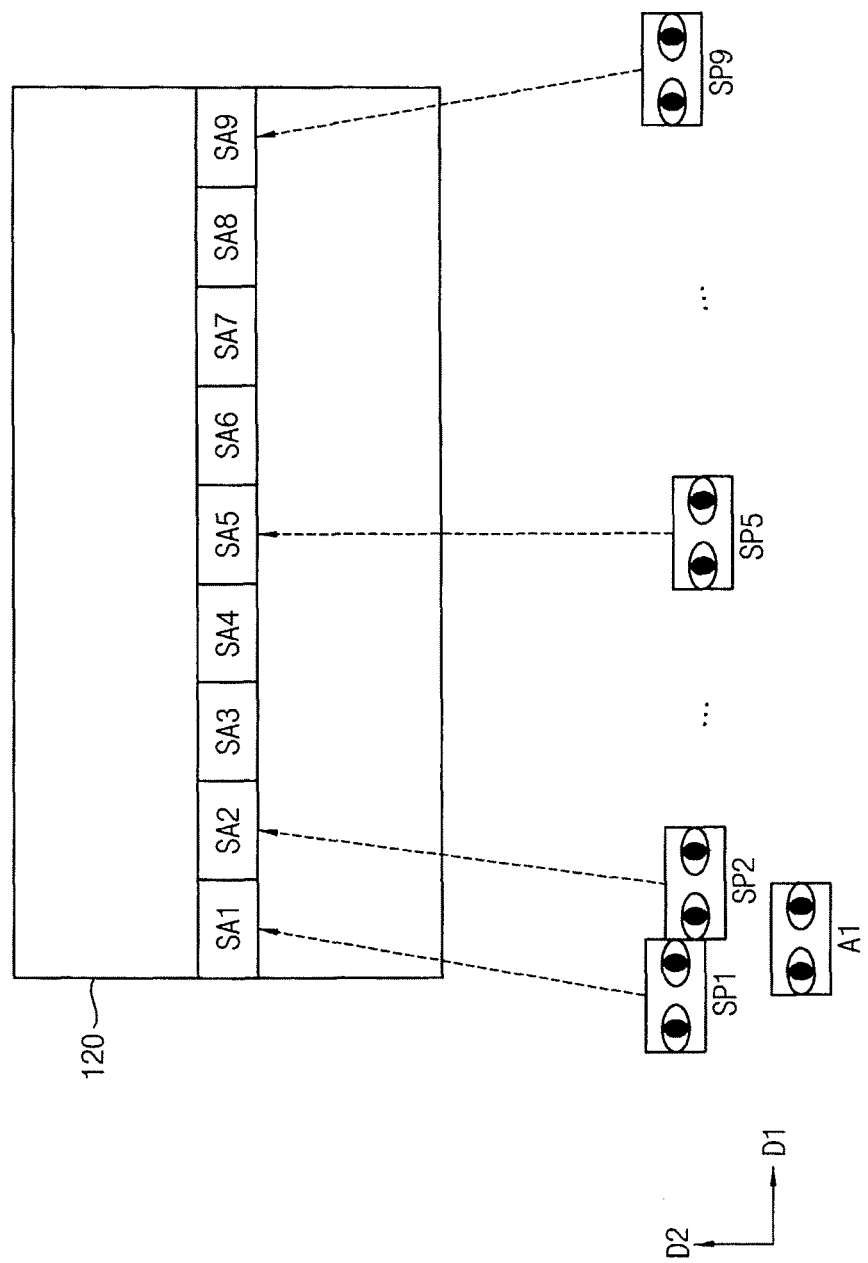
FIG. 3 is a front view illustrating a display panel of FIG. 1, according to an exemplary embodiment of the present invention.

FIG. 3 is a front view illustrating the display panel 120 of FIG. 1, according to an exemplary embodiment of the present invention.

Referring to FIGS. 1 to 3, the display panel 120 includes first to ninth set areas SA1, SA2, ..., and SA9 set corresponding to first to ninth set positions SP1, SP2, and SP9 in which 3D stereoscopic image crosstalk does not occur. The set areas SA1, SA2, ..., and SA9 may be set along the first direction D1.

In the present exemplary embodiment, the set positions SP1, SP2, ..., and SP9 do not overlap with each other, but they are not limited thereto. For example, the set positions SP1, SP2, ..., and SP9 may overlap with each other. In addition, the set areas SA1, SA2, ..., and SA9 do not overlap with each other, but they are not limited thereto. For example, the set areas SA1, SA2, ..., and SA9 may overlap with each other.

The move driving part 300 shoots the eye of the user using the shooting part 310, outputs the fix signal FS to fix the display panel assembly 110 when the position of the eye corresponds to one of the set positions SP1, SP2, ..., and SP9, and outputs the move signal MS1 to move the display panel assembly 110 in the first direction D1 when the position of the eye does not correspond to one of the set positions SP1, SP2, ..., and SP9.

For example, when the position of the eye is the first set position SP1 of the set positions SP1, SP2, ..., and SP9, the user position data output part 330 outputs the user position data UPD by mapping the position of the user (e.g., the first set position SP1) to the display panel 120, and determines that the user position data UPD and a first set area data of the first set area SA1 are substantially the same. Thus, the move driving part 300 outputs the fix signal FS to fix the display panel assembly 110. In other words, to keep it in place.

In addition, when the position of the eye is a first position A1, which does not correspond to one of the set positions SP1, SP2, ..., and SP9, the user position data output part 330 outputs the user position data UPD by mapping the first position A1 to the display panel 120, and determines that the user position data UPD and any one of the set area data SAD which are data of the set areas SA1, SA2, ..., and SA9 are different from each other. Thus, the move driving part 300 outputs the move signal MS1 to move the display panel assembly 110 in the first direction D1.

Specifically, the first position A1 is disposed between the first set position SP1 and the second set position SP2, and the user position data UPD generated by mapping the first position A1 to the display panel 120 is disposed between the first set area data of the first set area SA1 and a second set area data of the second set area SA2. The user position data UPD generated by mapping the first position A1 to the display panel 120 does not correspond to the any one of the set area data SAD of the set areas SA1, SA2, ..., and SP9, and thus, the move driving part 300 outputs the move signal MS1 to move the display panel assembly 110 in the first direction D1.

When the user position data UPD and the any one of the set area data SAD are different from each other, the move driving part 300 compares the user position data UPD with the set area data SAD adjacent to the user position data UPD, and the move driving part 300 matches the user position data UPD to the set area data SAD adjacent to the user position data UPD by moving the display panel assembly 110.

For example, when the position of the eye of the user is the first position A1 between the first set position SP1 and the second set position SP2, and the first position A1 is adjacent to the first set position SP1, the user position data UPD generated by mapping the first position A1 to the display panel 120 is adjacent to the first set area data of the first set area SA1. Thus, the move driving part 300 compares the user position data UPD with the first set area data using the comparing part 354, calculates a difference between the user position data UPD and the first set area data, and matches the user position data UPD to the first set area data by moving the display panel assembly 110 in the first direction D1 based on the difference between the user position data UPD and the first set area data. For example, the display panel assembly 110 may be moved to the right in the image shown in FIG. 3 by an amount corresponding to the calculated difference.

Figure 4:
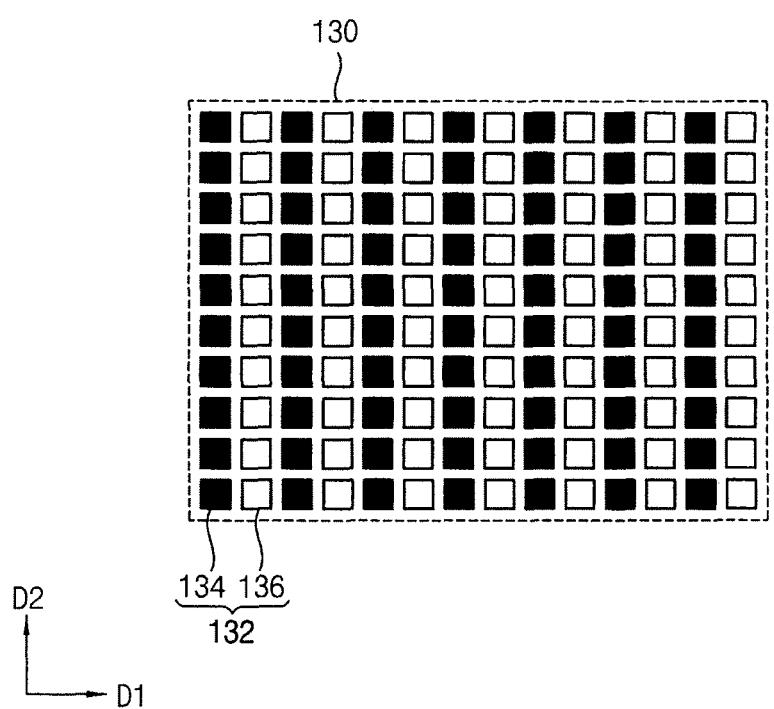
FIG. 4 is a plan view illustrating a barrier part of FIG. 1, according to an exemplary embodiment of the present invention.

FIG. 4 is a plan view illustrating the barrier part 130 of FIG. 1, according to an exemplary embodiment of the present invention.

Referring to FIGS. 1 and 4, the barrier part 130 includes the liquid crystal cells 132, and the liquid crystal cells 132 include the block cell 134 and the transmittance cell 136. The block cell 134 and the transmittance cell 136 are alternately disposed in the first direction D1, and extend in the second direction D2 substantially perpendicular to the first direction D1.

The left eye image data and the right eye image data are alternately disposed in the first direction D1 in the display panel 120 disposed under the barrier part 130.

Thus, the left eye image data is viewed by the left eye of the user and the right eye image data is viewed by the right eye of the user through the barrier part 130.

Figure 5:
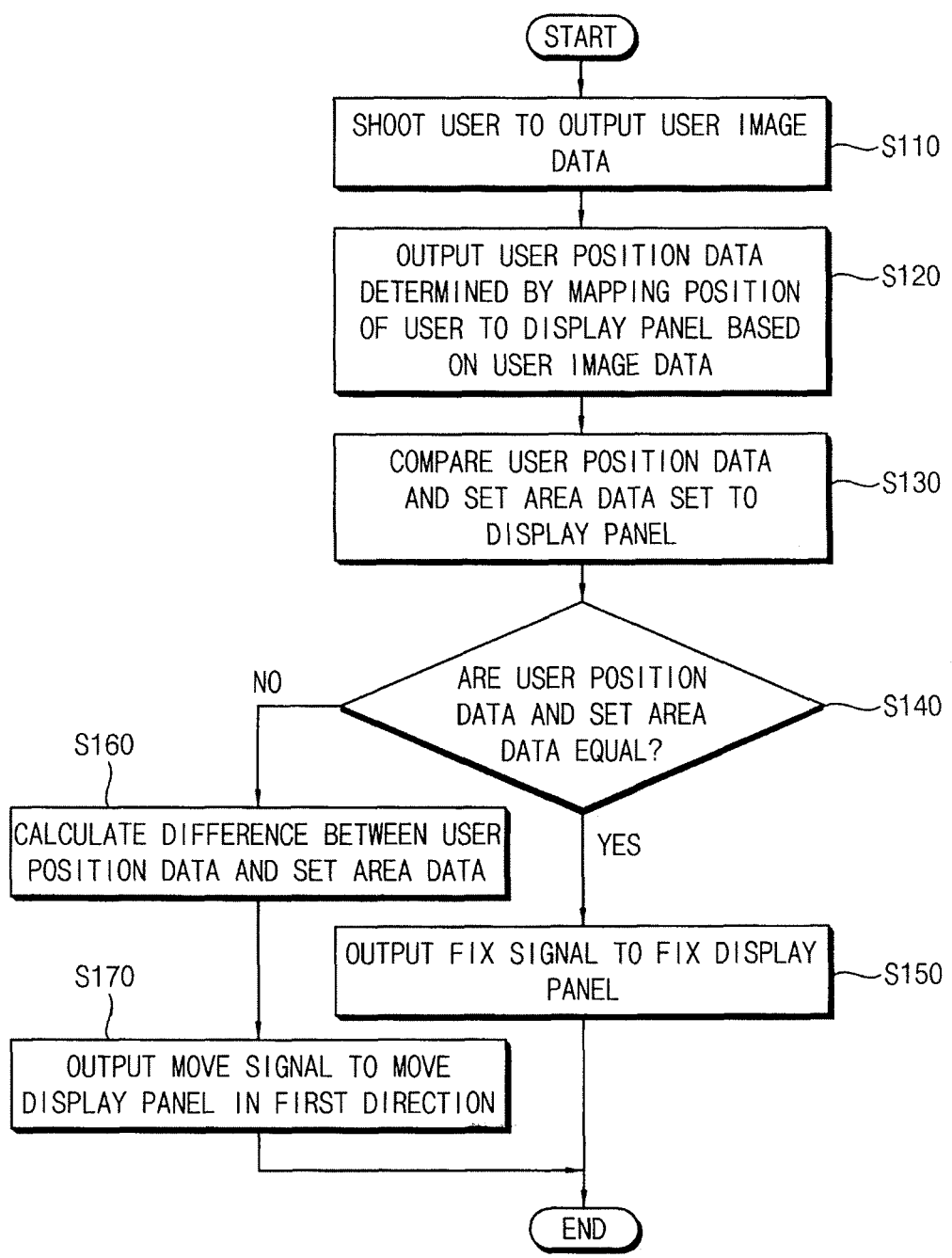
FIG. 5 is a flow chart illustrating a method of driving a display panel performed by a driving part of FIG. 1, according to an exemplary embodiment of the present invention.

FIG. 5 is a flow chart illustrating a method of driving a display panel performed by the driving part 200 of FIG. 1, according to an exemplary embodiment of the present invention.

Referring to FIGS. 1 to 3 and 5, the shooting part 310 of the move driving part 300 shoots the user to output the user image data UID (step S110). Specifically, the shooting part 310 shoots the eye of the user having the left eye and the right eye disposed in the first direction D1. For example, the shooting part 310 may include the camera shooting the user, and the camera may be disposed at the central portion of the upper end of the display panel assembly 110.

The position of the eye of the user representing the position of the user may be the first set position SP1 in which 3D stereoscopic image crosstalk does not occur. Alternatively, the position of the eye of the user may be the first position A1 in which 3D stereoscopic image crosstalk occurs and which is adjacent to the first set position SP1.

The user position data output part 330 of the move driving part 300 outputs the user position data UPD generated by mapping the position of the user to the display panel 120 based on the user image data UID (step S120). Specifically, the user position data output part 330 analyzes the position of the user based on the user image data UID, and outputs the user position data UPD generated by mapping the position of the user to the display panel 120.

For example, the user position data output part 330 may determine the position of the eye of the user by using the angle formed by the eye of the user and both sides of the display panel 120.

The comparing part 354 in the move control part 350 of the move driving part 300 compares the user position data UPD and the set area data SAD set to the display panel 120 (step S130). The set area data SAD are data generated by mapping the set positions SP1, SP2, . . . , and SP9 in which 3D stereoscopic image crosstalk does not occur to the display panel 120. Thus, the set area data SAD are data of the set areas SA1, SA2, . . . , and SA9.

The set area data SAD compared with the user position data UPD by the comparing part 354 may be the set area data SAD adjacent to the user position data UPD.

For example, when the position of the eye of the user is the first set position SP1, the user position data UPD generated by mapping the first set position SP1 to the display panel 120 may be compared with the first set area data of the first set area SA1 because the user position data UPD and the first set area data are substantially the same. Alternatively, when the position of the eye of the user is the first position A1, the user position data UPD generated by mapping the first position A1 to the display panel 120 is adjacent to the first set area data of the first set area SA1 among the set area data SAD, and thus, the user position data UPD generated by mapping the first position A1 to the display panel 120 may be compared with the first set area data of the first set area SA1.

The comparing part 354 in the move control part 350 of the move driving part 300 determines that the user position data UPD and the set area data SAD are substantially the same or not (step S140).

When the user position data UPD and the set area data SAD are substantially the same, the comparing part 354 outputs the fix signal FS to fix the display panel assembly 110 (step S150).

For example, when the position of the eye of the user is the first set position SP1, the user position data UPD may be substantially the same as the first set area data of the first set area SA1. Thus, the comparing part 354 outputs the fix signal FS to fix the display panel assembly 110.

When the user position data UPD and the set area data SAD are different from each other based on the comparison of the comparing part 354, the calculating part 356 in the move control part 350 of the move driving part 300 calculates the difference between the user position data UPD and the set area data SAD (step S160).

For example, when the position of the eye of the user is the first position A1, the calculating part 356 may calculate the difference between the user position data UPD generated by mapping the first position A1 to the display panel 120 and the first set area data of the first set area SA1.

The calculating part 356 outputs the move signal MS1 based on the difference between the user position data UPD and the set area data SAD to move the display panel assembly 110 in the first direction D1 (step S170). Thus, the user position data UPD is matched with the set area data SAD.

For example, when the position of the eye of the user is the first position A1, the display panel assembly 110 may be moved in the first direction D1 based on the difference between the user position data UPD generated by mapping the first position A1 to the display panel 120 and the first set area data of the first set area SA1 to match the user position data UPD with the first set area data.

According to the present exemplary embodiment, the move driving part 300 compares the user position data UPD corresponding to the position of the user and the set area data SAD where 3D stereoscopic image crosstalk does not occur, moves the display panel assembly 110 in the first direction D1 when the user position data UPD and the set area data SAD are different from each other to match the user position data UPD with the set area data SAD, and thus, 3D stereoscopic image crosstalk may be decreased when the user moves.

Figure 6:
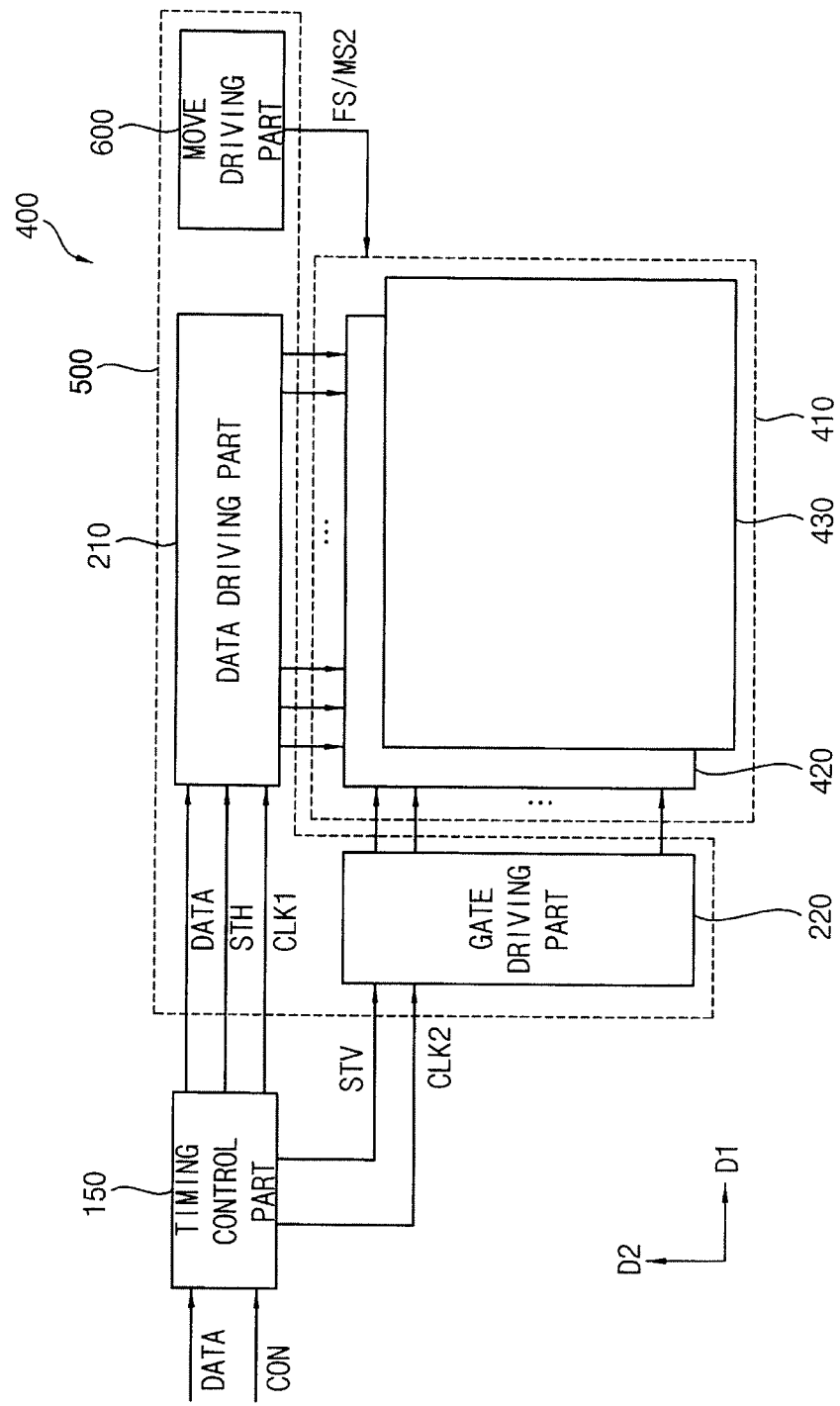
FIG. 6 is a block diagram illustrating a display apparatus according to an exemplary embodiment of the present invention.

FIG. 6 is a block diagram illustrating a display apparatus according to an exemplary embodiment of the present invention.

The display apparatus 400 according to the present exemplary embodiment is substantially the same as the display apparatus 100 according to the previous exemplary embodiment illustrated in FIG. 1 except for a display panel assembly 410 and a driving part 500. Thus, the same reference numerals may be used to refer to the same or like parts as those described in the previous exemplary embodiment and any further repetitive explanation concerning the above elements may be omitted.

Referring to FIG. 6, the display apparatus 400 according to the present exemplary embodiment includes the display panel assembly 410, the timing control part 150 and the driving part 500.

The display panel assembly 410 displays a 3D stereoscopic image, and includes a display panel 420 and a barrier part 430.

The display panel 420 receives image data DATA to display an image. For example, the image data DATA may include left eye image data and right eye image data for displaying the 3D stereoscopic image. When the image data DATA includes the left eye image data and the right eye image data, the left eye image data and the right eye image data may be alternately disposed in the display panel 420.

The display panel 420 includes a gate line substantially parallel with a first direction D1, a data line substantially parallel with a second direction D2 substantially perpendicular to the first direction D1, and a plurality of pixels. The first direction D1 may be substantially parallel with a long side of the display panel 420, and the second direction D2 may be substantially parallel with a short side of the display panel 420.

The barrier part 430 is disposed on the display panel 420. Alternatively, the barrier part 430 may be disposed under the display panel 420. The barrier part 430 includes a plurality of liquid crystal cells, and the liquid crystal cells alternately include a transmittance cell and a block cell. The left eye image data is viewed at a left eye of a user and the right eye image data is viewed at a right eye of a user by way of the transmittance cell and block cell in the barrier part 430.

In the present exemplary embodiment, the display panel assembly 410 includes the barrier part 430 on the display panel 420 for displaying the 3D stereoscopic image, but it is not limited thereto. For example, the display panel assembly 410 may include a lenticular lens part having a lenticular lens on the display panel 420.

The left eye image data and the right eye image data of the image data DATA displayed by the display panel assembly 410 including the barrier part 430 may overlap with each other according to a position of the user. Thus, crosstalk in the 3D stereoscopic image may occur.

For example, the left eye image data is viewed at the left eye of the user and the right eye image data is viewed at the right eye of the user by way of the barrier part 430 in a plurality of set areas set according to the position of the user. However, the left eye image data and the right eye image data may overlap with each other when the user is not in the set areas.

The driving part 500 includes the data driving part 210, the gate driving part 220 and a move driving part 600.

The move driving part 600 compares user position data generated by mapping the position of the user to the display panel 420 and the set area data set to the display panel 420 in a row, to generate and output a move control signal FS/MS2 for controlling a movement of the display panel assembly 410 including the display panel 420 and the barrier part 430. The move control signal FS/MS2 includes a fix signal FS for fixing the display panel assembly 410 and a move signal MS2 for moving the display panel assembly 410 in the second direction D2.

Specifically, the move driving part 600 determines that the user position data and the set area data are substantially the same or not, to output the fix signal FS for fixing the display panel assembly 410 when the user position data and the set area data are substantially the same and to output the move signal MS2 for moving the display panel assembly 410 when the user position data and the set area data are different from each other.

For example, the display panel assembly 410 may spin in the second direction D2 in response to the move signal MS2. Alternatively, the display panel assembly 410 may move in a straight line in the second direction D2 in response to the move signal MS2. The display apparatus 400 may further include a motor part for spinning or moving the display panel assembly 410.

Figure 7:
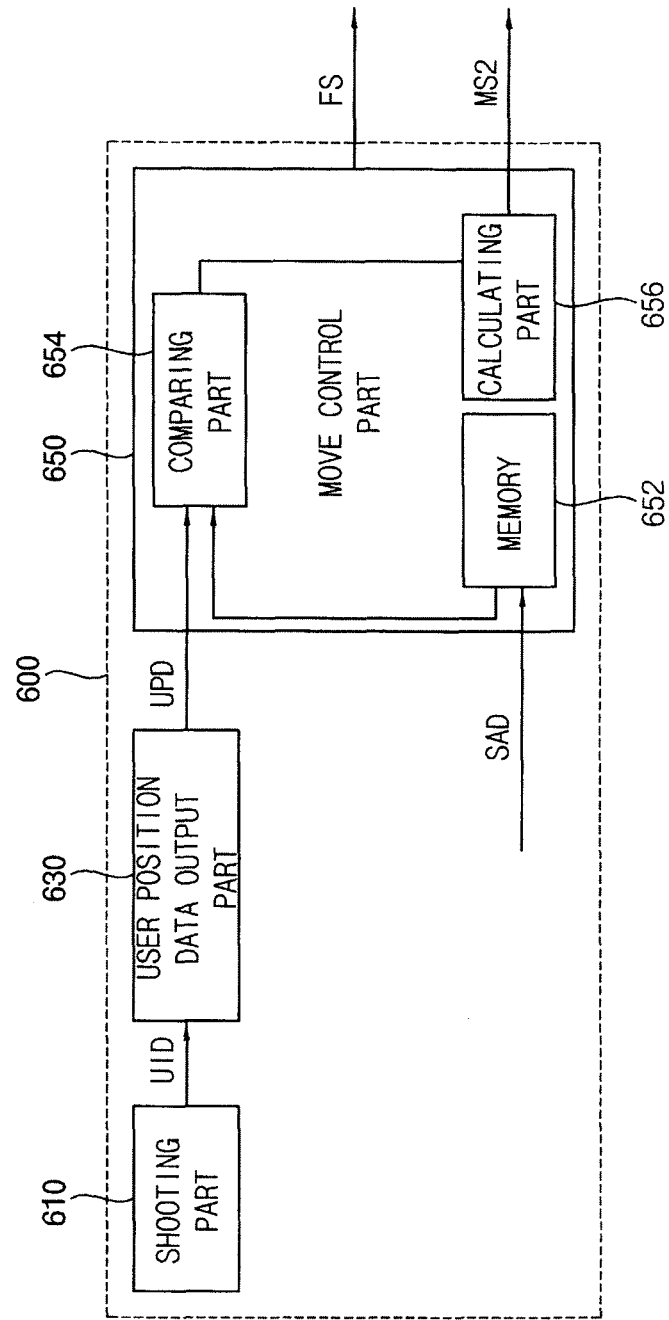
FIG. 7 is a block diagram illustrating a move driving part of FIG. 6, according to an exemplary embodiment of the present invention.

FIG. 7 is a block diagram illustrating the move driving part 600 of FIG. 6, according to an exemplary embodiment of the present invention.

Referring to FIGS. 6 and 7, the move driving part 600 includes a shooting part 610, a user position data output part 630 and a move control part 650.

The shooting part 610 shoots the user to generate and output user image data UID. Specifically, the shooting part 610 shoots an eye of the user having the left eye and the right eye disposed in the second direction D2. For example, the shooting part 610 may include a camera for shooting (e.g., photographing) the user, and the camera may be disposed at a central portion of a left side or at a central portion of a right side of the display panel assembly 410.

The user position data output part 630 analyzes the position of the user based on the user image data UID to output a user position data UPD generated by mapping the position of the user to the display panel 420.

Specifically, the user position data output part 630 analyzes a position of the eye of the user. For example, the user position data output part 630 may determine the position of the eye of the user using an angle formed by the eye of the user, a top portion and a bottom portion of the display panel 420.

The move control part 650 compares the user position data UPD and the set area data SAD to generate and output the fix signal FS or the move signal MS2. The move control part 650 includes a memory 652, a comparing part 654 and a calculating part 656.

The memory 652 stores the set area data SAD set to the display panel 420 in the row. The set area data SAD identify areas where the left eye image data is to be viewed by the left eye of the user through the barrier part 430 and the right eye image data is to be viewed by the right eye of the user through the barrier part 430. Thus, the set area data SAD identify areas where crosstalk in the 3D stereoscopic image does not occur.

The comparing part 654 compares the user position data UPD and the set area data SAD. The comparing part 654 outputs the fix signal FS when the user position data UPD and the set area data SAD are substantially the same.

The set area data SAD compared with the user position data UPD by the comparing part 654 may be the set area data SAD adjacent to the user position data UPD.

The calculating part 656 calculates a difference between the user position data UPD and the set area data SAD when the user position data UPD and the set area data SAD are different from each other, and outputs the move signal MS2 for moving the display panel assembly 410 in the second direction D2 based on the difference between the user position data UPD and the set area data SAD.

Figure 8:
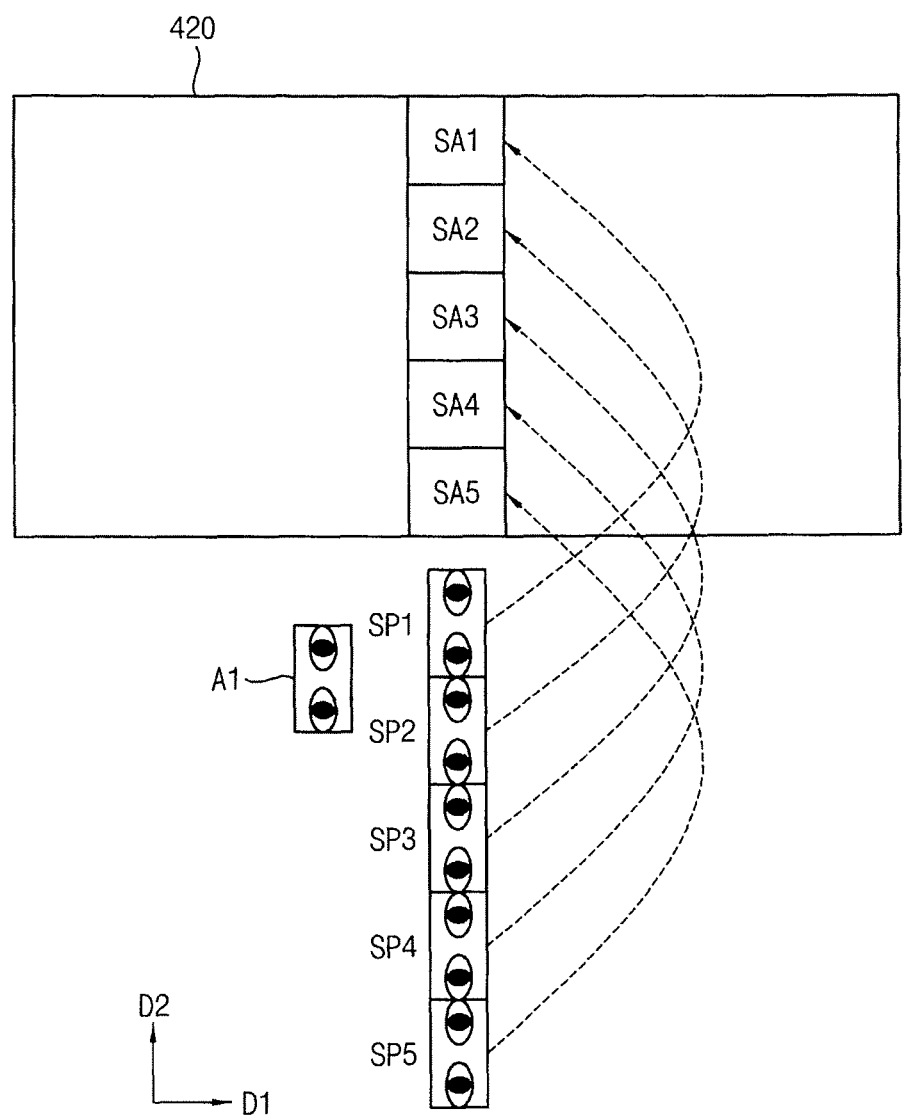
FIG. 8 is a front view illustrating a display panel of FIG. 6, according to an exemplary embodiment of the present invention.

FIG. 8 is a front view illustrating the display panel 420 of FIG. 6, according to an exemplary embodiment of the present invention.

Referring to FIGS. 6 to 8, the display panel 420 includes first to fifth set areas SA1, SA2, . . . , and SA5 set corresponding to first to fifth set positions SP1, SP2, . . . , and SP5 in which 3D stereoscopic image crosstalk does not occur. The set areas SA1, SA2, . . . , and SA5 may be set along the second direction D2.

In the present exemplary embodiment, the set positions SP1, SP2, . . . , and SP5 do not overlap with each other, but they are not limited thereto. For example, the set positions SP1, SP2, . . . , and SP5 may overlap with each other. In addition, the set areas SA1, SA2, . . . , and SA5 do not overlap with each other, but they are not limited thereto. For example, the set areas SA1, SA2, . . . , and SA5 may overlap with each other.

The move driving part 600 shoots the eye of the user using the shooting part 610, outputs the fix signal FS to fix the display panel assembly 410 when the position of the eye corresponds to one of the set positions SP1, SP2, . . . , and SP5, and outputs the move signal MS2 to move the display panel assembly 410 in the second direction D2 when the position of the eye does not correspond to one of the set positions SP1, SP2, . . . , and SP5.

For example, when the position of the eye is the first set position SP1 of the set positions SP1, SP2, . . . , and SP5, the user position data output part 630 outputs the user position data UPD by mapping the position of the user (e.g., the first set position SP1) to the display panel 420, and determines that the user position data UPD and a first set area data of the first set area SA1 are substantially the same. Thus, the move driving part 600 outputs the fix signal FS to fix the display panel assembly 410. In other words, to keep it in place.

In addition, when the position of the eye is a first position A1, which does not correspond to one of the set positions SP1, SP2, and SP5, the user position data output part 630 outputs the user position data UPD by mapping the first position A1 to the display panel 420, and determines that the user position data UPD and any one of the set area data SAD which are data of the set areas SA1, SA2, . . . , and SA5 are different from each other. Thus, the move driving part 600 outputs the move signal MS2 to move the display panel assembly 410 in the second direction D2.

Specifically, the first position A1 is disposed between the first set position SP1 and the second set position SP2, and the user position data UPD generated by mapping the first position A1 to the display panel 420 is disposed between the first set area data of the first set area SA1 and a second set area data of the second set area SA2. The user position data UPD generated by mapping the first position A1 to the display panel 420 does not correspond to the any one of the set area data SAD of the set areas SA1, SA2, . . . , and SP5, and thus, the move driving part 600 outputs the move signal MS2 to move the display panel assembly 410 in the second direction D2.

When the user position data UPD and the any one of the set area data SAD are different from each other, the move driving part 600 compares the user position data UPD with the set area data SAD adjacent to the user position data UPD, and the move driving part 600 matches the user position data UPD to the set area data SAD adjacent to the user position data UPD by moving the display panel assembly 410.

For example, when the position of the eye of the user is the first position A1 between the first set position SP1 and the second set position SP2, and the first position A1 is adjacent to the first set position SP1, the user position data UPD generated by mapping the first position A1 to the display panel 420 is adjacent to the first set area data of the first set area SA1. Thus, the move driving part 600 compares the user position data UPD with the first set area data using the comparing part 654, calculates a difference between the user position data UPD and the first set area data, and matches the user position data UPD to the first set area data by moving the display panel assembly 410 in the second direction D2 based on the difference between the user position data UPD and the first set area data. For example, the display panel assembly 410 may be moved down in the image shown in FIG. 8 by an amount corresponding to the calculated difference.

Figure 9:
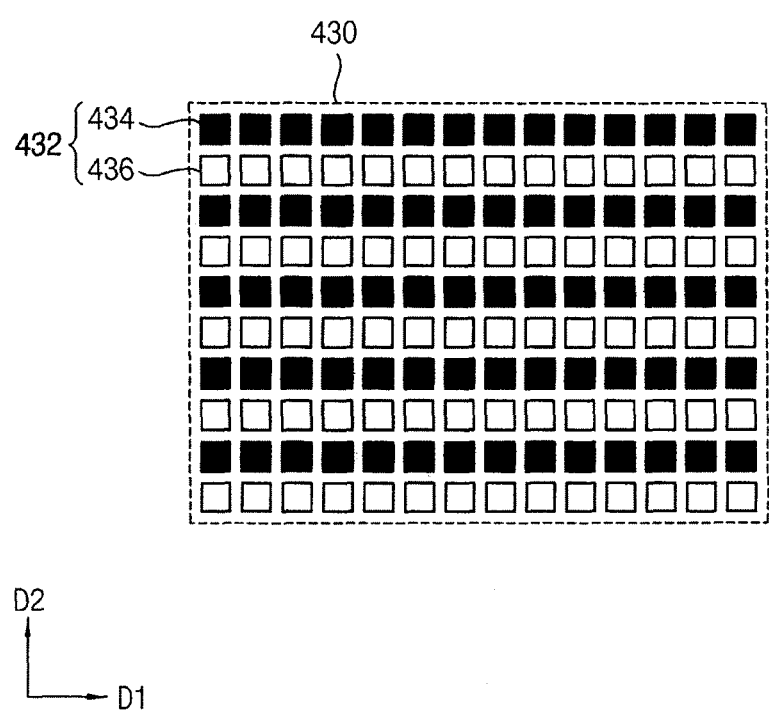
FIG. 9 is a plan view illustrating a barrier part of FIG. 6, according to an exemplary embodiment of the present invention.

FIG. 9 is a plan view illustrating the barrier part 430 of FIG. 6, according to an exemplary embodiment of the present invention.

Referring to FIGS. 6 and 9, the barrier part 430 includes the liquid crystal cells 432, and the liquid crystal cells 432 include the block cell 434 and the transmittance cell 436. The block cell 434 and the transmittance cell 436 are alternately disposed in the second direction D2, and extend in the first direction D1 substantially perpendicular to the second direction D2.

The left eye image data and the right eye image data are alternately disposed in the second direction D2 in the display panel 420 disposed under the barrier part 430.

Thus, the left eye image data is viewed by the left eye of the user and the right eye image data is viewed by the right eye of the user through the barrier part 430.

Figure 10:
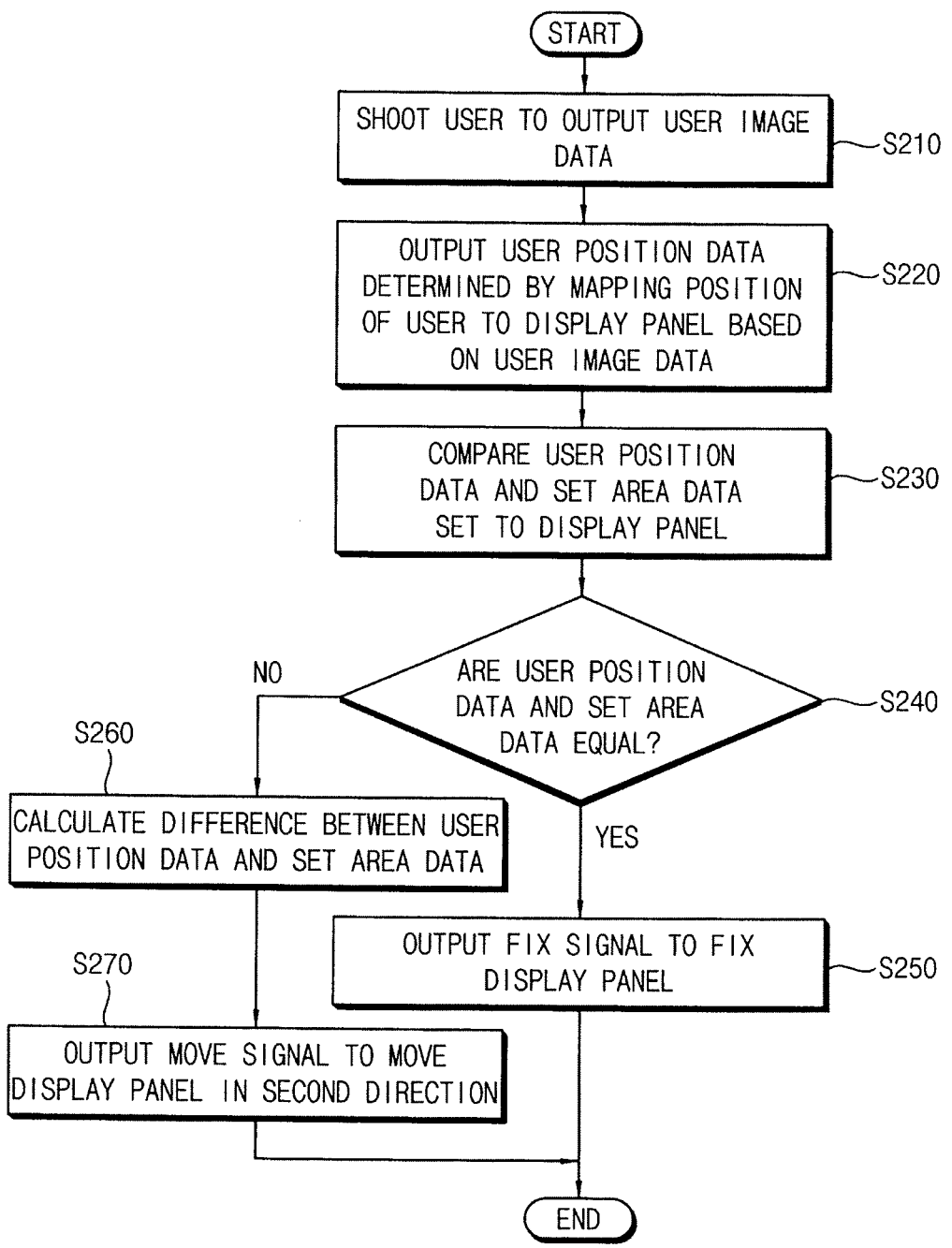
FIG. 10 is a flow chart illustrating a method of driving a display panel performed by a driving part of FIG. 6, according to an exemplary embodiment of the present invention.

FIG. 10 is a flow chart illustrating a method of driving a display panel performed by the driving part 500 of FIG. 6, according to an exemplary embodiment of the present invention.

Referring to FIGS. 6 to 8 and 10, the shooting part 610 of the move driving part 600 shoots the user to output the user image data UID (step S210). Specifically, the shooting part 610 shoots the eye of the user having the left eye and the right eye disposed in the second direction D2. For example, the shooting part 610 may include the camera shooting the user, and the camera may be disposed at the central portion of the left side or at the central portion of the right side of the display panel assembly 410.

The position of the eye of the user representing the position of the user may be the first set position SP1 in which 3D stereoscopic image crosstalk does not occur. Alternatively, the position of the eye of the user may be the first position A1 in which 3D stereoscopic image crosstalk does occur and which is adjacent to the first set position SP1.

The user position data output part 630 of the move driving part 600 outputs the user position data UPD generated by mapping the position of the user to the display panel 420 based on the user image data UID (step S220). Specifically, the user position data output part 630 analyzes the position of the user based on the user image data UID, and outputs the user position data UPD generated by mapping the position of the user to the display panel 420.

For example, the user position data output part 630 may determine the position of the eye of the user by using the angle formed by the eye of the user, the top portion and the bottom portion of the display panel 420.

The comparing part 654 in the move control part 650 of the move driving part 600 compares the user position data UPD and the set area data SAD set to the display panel 420 (step S230). The set area data SAD are data generated by mapping the set positions SP1, SP2, . . . , and SP5 in which 3D stereoscopic image crosstalk does not occur to the display panel 420. Thus, the set area data SAD are data of the set areas SA1, SA2, . . . , and SA5.

The set area data SAD compared with the user position data UPD by the comparing part 654 may be the set data SAD adjacent to the user position data UPD.

For example, when the position of the eye of the user is the first set position SP1, the user position data UPD generated by mapping the first set position SP1 to the display panel 420 may be compared with the first set area data of the first set area SA1 because the user position data UPD and the first set area data are substantially the same. Alternatively, when the position of the eye of the user is the first position A1, the user position data UPD generated by mapping the first position A1 to the display panel 420 is adjacent to the first set area data of the first set area SA1 among the set area data SAD, and thus, the user position data UPD generated by mapping the first position A1 to the display panel 420 may be compared with the first set area data of the first set area SA1.

The comparing part 654 in the move control part 650 of the move driving part 600 determines that the user position data UPD and the set area data SAD are substantially the same or not (step S240).

When the user position data UPD and the set area data SAD are substantially the same, the comparing part 654 outputs the fix signal FS to fix the display panel assembly 410 (step S250).

For example, when the position of the eye of the user is the first set position SP1, the user position data UPD may be substantially the same as the first set area data of the first set area SA1. Thus, the comparing part 654 outputs the fix signal FS to fix the display panel assembly 410.

When the user position data UPD and the set area data SAD are different from each other based on the comparison of the comparing part 654, the calculating part 656 in the move control part 650 of the move driving part 600 calculates the difference between the user position data UPD and the set area data SAD (step S260).

For example, when the position of the eye of the user is the first position A1, the calculating part 656 may calculate the difference between the user position data UPD generated by mapping the first position A1 to the display panel 420 and the first set area data of the first set area SA1.

The calculating part 656 outputs the move signal MS2 based on the difference between the user position data UPD and the set area data SAD to move the display panel assembly 410 in the second direction D2 (step S270). Thus, the user position data UPD is matched with the set area data SAD.

For example, when the position of the eye of the user is the first position A1, the display panel assembly 410 may be moved in the second direction D2 based on the difference between the user position data UPD generated by mapping the first position A1 to the display panel 420 and the first set area data of the first set area SA1 to match the user position data UPD with the first set area data.

According to the present exemplary embodiment, the move driving part 600 compares the user position data UPD corresponding to the position of the user and the set area data SAD where 3D stereoscopic image crosstalk does not occur, moves the display panel assembly 410 in the second direction D2 when the user position data UPD and the set area data SAD are different from each other to match the user position data UPD with the set area data SAD, and thus, 3D stereoscopic image crosstalk may be decreased when the user moves.

According to the exemplary embodiments of the present invention there is provided a method of driving a display panel, a display panel driving apparatus for performing the method and a display apparatus having the display panel driving apparatus, in which 3D stereoscopic image crosstalk may be decreased when a user moves, and thus, a display quality of the display apparatus displaying a 3D stereoscopic image may be enhanced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of driving a display panel, the method comprising:
   receiving user image data and outputting user position data based on the user image data, the user image data being generated by photographing a user, the user position data being generated by mapping a position of the user to a display panel;
   comparing a plurality of set area data with the user position data and outputting a move control signal based on the comparison of the user position data and the set area data, the set area data being set to the display panel; and
   controlling the movement of the display panel from one location to another location in response to the move control signal,
   wherein the set area data identify areas where crosstalk in a three-dimensional (3D) stereoscopic image does not occur, the areas including first areas arranged in rows along a first direction of the display panel and second areas arranged in columns along a second direction of the display panel, and
   wherein when the user position data does not match one of the first or second areas, a difference in the user position data is determined with respect to an adjacent one of the first or second areas and the display panel is moved according to the difference so that the user position data matches the adjacent one of the first or second areas.

2. The method of claim 1, wherein outputting the move control signal comprises:
   outputting a fix signal to fix the display panel in place when the user position data and the set area data are substantially the same; and
   outputting a move signal to move the display panel when the user position data and the set area data are different from each other.

3. The method of claim 1, wherein controlling the movement of the display panel includes matching the user position data with the set area data.

4. The method of claim 3, wherein matching the user position data with the set area data includes matching the user position data with the set area data adjacent to the user position data.

5. The method of claim 1, wherein the position of the user is a position of an eye of the user.

6. The method of claim 5, wherein a left eye and a right eye of the user are disposed in the first direction substantially parallel with a long side of the display panel, the set area data are set along the first direction in a row, and controlling the movement of the display panel includes moving the display panel in the first direction.

7. The method of claim 5, wherein a left eye and a right eye of the user are disposed in the second direction substantially parallel with a short side of the display panel, the set area data are set along the second direction in a row, and controlling the movement of the display panel includes moving the display panel in the second direction.

8. The method of claim 1, wherein controlling the movement of the display panel includes spinning the display panel.

9. The method of claim 1, wherein controlling the movement of the display panel includes moving the display panel in a straight line.

10. The method of claim 1, further comprising:
    calculating a difference between the user position data and the set area data to generate the move control signal.

11. The method of claim 1, further comprising:
    converting two-dimensional (2D) plane image data to 3D stereoscopic image data by selectively transmitting and blocking the 2D plane image data applied to the display panel.

12. A display panel driving apparatus, comprising:
    a user position data output part configured to receive user image data and output user position data based on the user image data, the user image data being generated by photographing a user, the user position data being generated by mapping a position of the user to a display panel; and
    a move control part configured to compare a plurality of set area data with the user position data and output a move control signal based on the comparison of the user position data and the set area data, the set area data being set to the display panel, the move control signal controlling a movement of the display panel from one location to another location,
    wherein the set area data identify areas where crosstalk in a three-dimensional (3D) stereoscopic image does not occur, the areas including first areas arranged in rows along a first direction of the display panel and second areas arranged in columns along a second direction of the display panel, and
    wherein when the user position data does not match one of the first or second areas, a difference in the user position data is determined with respect to an adjacent one of the first or second areas and the display panel is moved according to the difference so that the user position data matches the adjacent one of the first or second areas.

13. The display panel driving apparatus of claim 12, wherein the move control part outputs a fix signal fixing the display panel in place when the user position data and the set area data are substantially the same, and the move control part outputs a move signal moving the display panel when the user position data and the set area data are different from each other.

14. A display apparatus, comprising:
    a display panel configured to display image data and including a plurality of set area data, the set area data being set to the display panel; and
    a display panel driving apparatus including a user position data output part configured to receive user image data and output user position data based on the user image data, and a move control part configured to compare the set area data with the user position data and output a move control signal based on the comparison of the user position data and the set area data, the user image data being generated by photographing a user, the user position data being generated by mapping a position of the user to the display panel, the move control signal controlling a movement of the display panel from one location to another location,
    wherein the set area data identify areas where crosstalk in a three-dimensional (3D) stereoscopic image does not occur, the areas including first areas arranged in rows along a first direction of the display panel and second areas arranged in columns along a second direction of the display panel, and wherein when the user position data does not match one of the first or second areas, a difference in the user position data is determined with respect to an adjacent one of the first or second areas and the display panel is moved according to the difference so that the user position data matches the adjacent one of the first or second areas.

15. The display apparatus of claim 14, wherein the move control part outputs a fix signal fixing the display panel in place when the user position data and the set area data are substantially the same, and the move control part outputs a move signal moving the display panel when the user position data and the set area data are different from each other.

16. The display apparatus of claim 14, wherein the image data is two-dimensional (2D) plane image data, and further comprising: a barrier part disposed on the display panel, the barrier part including a transmittance cell and a block cell, the barrier part configured to convert the 2D plane image data to 3D stereoscopic image data.

17. The display apparatus of claim 16, wherein a left eye and a right eye of the user are disposed in the first direction substantially parallel with a long side of the display panel, the set area data are set along the first direction in a row, and the move control part moves the display panel in the first direction.

18. The display apparatus of claim 17, wherein the transmittance cell and the block cell are alternately disposed in the first direction and extend in the second direction substantially perpendicular to the first direction.

19. The display apparatus of claim 16, wherein a left eye and a right eye of the user are disposed in the second direction substantially parallel with a short side of the display panel, the set area data are set along the second direction in a row, and the move control part moves the display panel in the second direction.

20. The display apparatus of claim 19, wherein the transmittance cell and the block cell are alternately disposed in the second direction and extend in a first direction substantially perpendicular to the second direction.

21. A method of driving a display panel, the method comprising:

receiving user detection data;

generating user position data based on the user detection data, the user position data indicative of a position of the user with respect to a display panel; and moving the display panel from one location to another location based on a comparison of the user position data with data indicative of predetermined viewing locations, wherein the predetermined viewing locations correspond to areas where crosstalk in a three-dimensional (3D) stereoscopic image does not occur, the areas including first areas arranged in rows along a first direction of the display panel and second areas arranged in columns along a second direction of the display panel, and wherein when the user position data does not match one of the first or second areas, a difference in the user position data is determined with respect to an adjacent one of the first or second areas and the display panel is moved according to the difference so that the user position data matches the adjacent one of the first or second areas.

* * * * *